July 16, 1929.  R. POHL  1,721,409
PROTECTIVE ARRANGEMENT
Filed Aug. 31, 1927  2 Sheets-Sheet 1
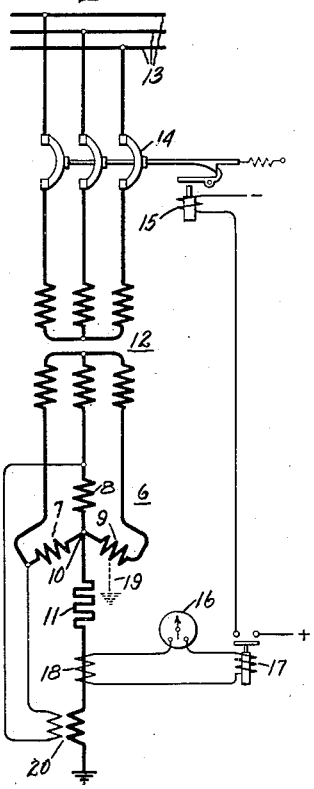
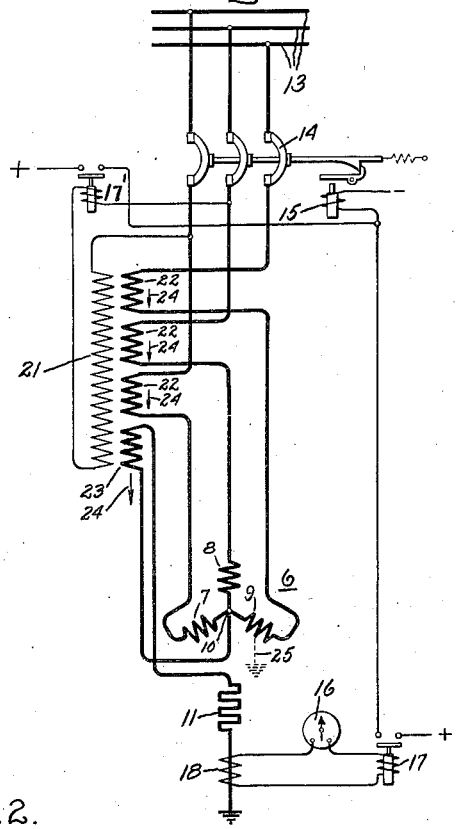
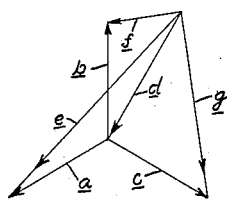
Inventor:
Robert Pohl,
by *His Attorney.*

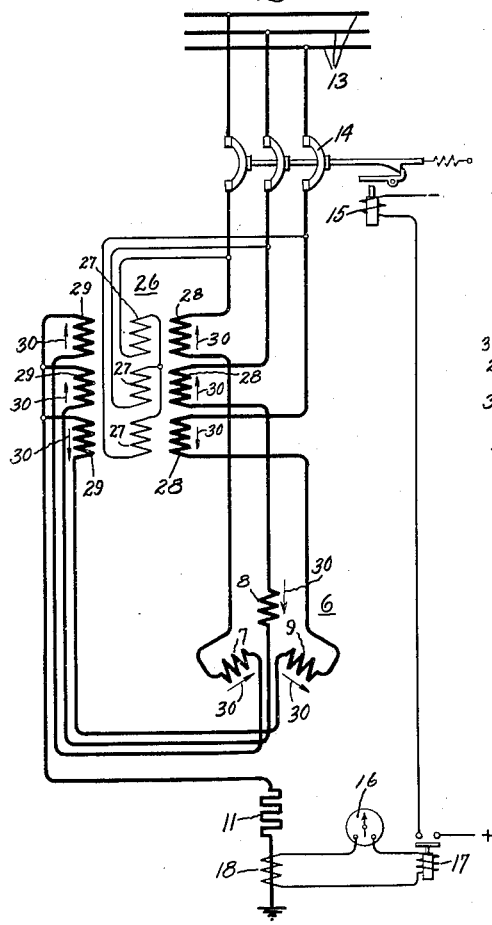
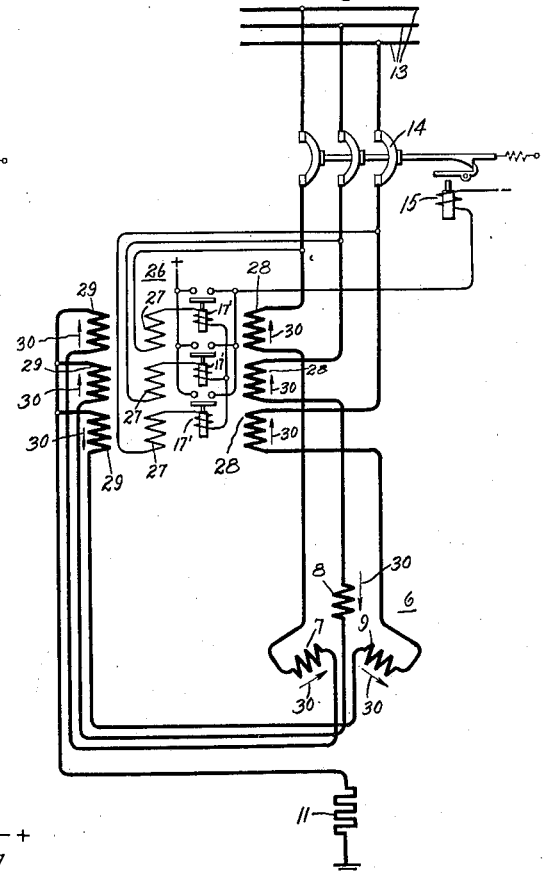
Inventor:
Robert Pohl,
by *[signature]*
His Attorney.

Patented July 16, 1929.

1,721,409

UNITED STATES PATENT OFFICE.

ROBERT POHL, OF BERLIN, GERMANY, ASSIGNOR TO GENERAL ELECTRIC COMPANY, A CORPORATION OF NEW YORK.

PROTECTIVE ARRANGEMENT.

Application filed August 31, 1927, Serial No. 216,720, and in Germany September 24, 1926.

My invention relates to improvements in protective arrangements for electric systems and apparatus and more particularly to improvements in the protection of dynamo-electric machines on the occurrence of ground faults.

For the protection of electric systems and apparatus such as alternating current dynamo-electric machines on the occurrence of ground faults, a neutral of the system such as that of a generator is grounded either directly or through an impedance which may be a relatively high resistance and means comprising relays responsive to the current in the ground connection are arranged to control the connection of the generator to the system and also in some cases the field excitation circuit. While such an arrangement may operate satisfactorily if the ground fault on a generator winding does not occur too close to the neutral, the operation of the relays and the switches controlled thereby is rendered uncertain when a ground fault occurs on a winding so close to the neutral point that the voltage impressed on the ground connection, that is, by the portion of the winding between the ground fault and the neutral, is below a minimum value.

An object of my invention is to eliminate this uncertainty of operation so as to insure reliable operation and proper protection irrespective of the location of the ground fault.

In accordance with my invention, to the voltage which is impressed on the ground connection on the occurrence of a ground fault and which varies with the location of the fault, there is added an auxiliary voltage. This is preferably substantially constant and may differ from the voltage due to the ground fault in phase or frequency or both. This auxiliary voltage or impressed electromotive force combines with the voltage on the ground connection due to the ground fault to produce a resultant voltage the magnitude of which is dependent on the location of the ground fault. Consequently any devices such as indicators, relays, and the like are actuated with certainty even though a ground fault occurs closely to or substantially at the neutral of the machine. This will be obvious since the vectorial sum of the two voltages even when the voltage due to the ground fault becomes zero is always sufficient to actuate the necessary devices. When the ground fault is substantially at the neutral of the machine, the vectorial sum of the voltages becomes substantially the same as the auxiliary voltage, the magnitude of which can readily be made such as to insure proper operation of the indicating and/or protective devices irrespective of the location of a ground fault.

My invention will be better understood from the following description when considered in connection with the accompanying drawing and its scope will be pointed out in the appended claims.

In the accompanying drawings, Fig. 1 illustrates diagrammatically a protective arrangement embodying my invention, Fig. 2 is a vector diagram for explanatory purposes, and Figs. 3, 4, and 5 illustrate diagrammatically modifications of my invention.

The embodiment of my invention shown in Fig. 1 comprises an arrangement for the protection of electric apparatus such as a three phase generator 6 having windings 7, 8, 9 with a neutral 10. The windings may be connected to ground either directly or through an impedance such as a resistance 11. As shown the generator 6 supplies a transformer 12 which may be connected to a bus 13 by a circuit breaker 14 having a trip coil 15. For indicating and protective purposes, I provide suitable devices such as an ammeter 16 and a relay 17 which are connected and arranged to be energized on the occurrence of a ground fault on the windings 7, 8, 9. For this purpose, the devices 16 and 17 may be connected in circuit with the ground connection through a current transformer 18.

If a ground fault occurs on one of the generator windings, such as 9, indicated by 19, there will appear in the ground connection a current whose magnitude is dependent on the voltage between the normally grounded terminal of the winding 9 and the ground fault point 19 and also on the impedance of the ground connection. The ammeter 16 and the relay 17 become energized and the latter effects the disconnection of the generator 6 from the bus 13 by causing the opening of the circuit breaker 14 and may also effect the interruption of the field excitation circuit as is generally known.

Since a ground fault may occur at or near the line terminal of a winding, it is possible for full line to ground voltage to be impressed on the ground connection. It is, however, often necessary in order to limit the ground current under such a condition to have the impedance of the ground connection, including the resistance 11, so high that on the occurrence of a ground fault at or near the ground terminal of a winding, the voltage on the ground connection is not sufficient to operate the devices 16, 17 particularly if the ground fault occurs at the ground terminal when the voltage becomes zero.

In order to take care of this low voltage condition, that is when a ground fault occurs relatively closely to the grounded end of a winding, so as to insure proper operation of the devices 16, 17, I provide means arranged to impress an electromotive force on the ground connection. As shown in Fig. 1, this electromotive force may be derived from the load side of the generator through suitable transforming means such as a potential transformer 20 whose primary is connected across one phase of the generator circuit and whose secondary is in circuit with the ground connection. While the primary of the transformer 20 is shown connected to the line terminals of windings 7 and 8, it may be connected across other combinations of windings or taps therefrom. Obviously the transformer 20 may be suitably proportioned to impress the desired electromotive force.

Referring now to Fig. 2, the vectors $a$, $b$, $c$ represent voltages which may be impressed on the ground connection in case of a ground fault on the windings 7, 8, 9 respectively and vector $d$ represents the electromotive force impressed on the ground connection by the potential transformer 20. This electromotive force of course effects a circulation of current in the ground connection only when a ground fault occurs. The vectors $e$, $f$, $g$ represent the resultant voltages which appear in the ground connection in case of ground faults on the windings 7, 8, 9 respectively. It will be obvious from Fig. 2 that the minimum voltage is for the winding 8 grounded at a point such that the vector $f$ is substantially perpendicular to the vector $b$. Thus no matter where a ground occurs on any one of the windings 7, 8, 9 the voltage on the ground connection is such as to insure operation of the devices 16, 17 and protection of the generator and the circuits connected thereto.

While I have shown the auxiliary or impressed electromotive force as derived from the generator 6 itself, it is obvious that it may be obtained from any suitable source. If the auxiliary source is an alternating current source, its frequency is preferably different from that of the generator 6 so that in case of a ground fault, the two may not be or remain in substantial phase opposition with their resultant practically zero for any appreciable time.

With the arrangement shown in Fig. 1, the neutral 10 is raised above ground potential by the voltage impressed on the ground connection by the transformer 20. When the generator 6 is isolated from the system network which it feeds by the transformer 12, this will not cause any current to circulate normally in the ground connection in case other system neutrals are grounded. Where the generator is connected directly to the network, I arrange in accordance with my invention to eliminate the voltage displacement of the neutral relatively to the network and thereby prevent any tendency normally to circulate current in the ground connection so that the relay 17 is actuated only on the occurrence of a fault. One way of accomplishing this is to introduce an additional impressed electromotive force into the conductors leading from the generator windings on the load side thereof equal and opposite to the electromotive force impressed on the ground connection.

As illustrated in Fig. 3, this opposing or compensating electromotive force may be derived from the generator 6 through a single phase transformer having a primary 21 connected across one phase of the generator on the load side thereof, three secondaries 22 connected in the generator leads on the load side thereof and a secondary 23 in the ground connection. The three secondaries 22 are so proportioned as to be capable of carrying the generator current and are so connected as to impress voltages equal and opposite to the electromotive force impressed on the earth connection by the winding 23. The arrows 24 are intended to indicate this compensation of voltages and represent of course only an instantaneous condition in so far as absolute direction is concerned. In case of a ground fault on one of the generator windings as indicated at 25, the electromotive force supplied by the secondary 23 has a closed circuit including the ground connection in which to circulate a current independently of any of the opposing electromotive forces of the secondaries 22 and the relay 17 is energized as in Fig. 1 in accordance with the vector sum of the voltage due to the portion of the generator winding 9 between the neutral 10 and the ground fault and the impressed voltage due to the secondary 23.

Instead of connecting the ground fault responsive device 17 in the ground connection, a relay 17′ may be connected in the transformer primary 21. With this arrangement the relay 17′ will operate in response to a ground fault on the generator 6, but not to a ground fault on the network to which the generator is connected, for only in case of a ground fault on the generator will the sum of the currents in the secondaries 22, 23 differ from zero so that an increase in the current in the primary 21 sufficient to operate the relay 17' can occur. This is obvious for with a ground fault on the network the fault current will appear alike in winding 23 and one of the windings 22 while with the ground fault on the generator it will appear only in the winding 23. Under normal conditions and also in case of a ground fault on the network, nothing but the magnetizing current of the transformer, comprising the windings 21, 22 and 23, appears in the winding of the relay 17'. This magnetizing current, which is quite small, does not effect the operation of the relay.

In the embodiment of my invention shown in Fig. 4, the auxiliary electromotive force is impressed on the ground connection not between the neutral and ground, but between the grounded ends or terminals of the generator windings 7, 8, 9 and a neutral. For this purpose I provide a polyphase potential transformer 26, each phase of which comprises a primary 27 and two like secondaries 28, 29 each arranged to provide the desired impressed electromotive forces, but connected and arranged normally to oppose so as to prevent circulation of current. In connection with rotating current machines instead of a polyphase transformer, there may be employed a plurality of single-phase transformers each having two similar secondaries. The primaries 27 may be connected in star to the load side of the generator. The secondaries 28 are connected in series with the conductors of the generator circuit on the load side of the generator. The secondaries 29 are connected in series with the windings 7, 8, 9 on the ground side and in star to form a neutral grounded through the resistance 11. If it is desired to have the impressed electromotive force differ in phase from the corresponding line to ground voltage, the primaries 27 of the transformer 26 may be delta connected if the generator windings are star connected and vice-versa. The impressed electromotive force may, however, be of like phase to the corresponding star voltage and, if so, as impressed on the ground connection at the grounded end of a winding, it must be added to the line to ground voltage as indicated by the arrows 30. Otherwise, there will be a point in the winding at ground potential, and if this point were to become grounded the protective apparatus would not be actuated.

In order to obtain selective protection, that is for faults on the generator only, the impressed voltage may differ in frequency from the voltage of the generator by employing any suitable means. Thus the transformer 26 may be of the frequency-doubling type, the relay 17 being tuned to the frequency of the impressed electromotive force so as to operate only on the occurrence of ground faults on the generator.

Selective operation of the protective device may also be obtained by connecting the relays 17' in the primaries of the transformer 26 as shown in Fig. 5. In case of a ground fault on the system to which the generator 6 is connected, the currents in the secondaries 28 and 29 will balance each other in each phase so that there occurs no rise in the current in the primary 27 although the currents in the various secondaries are not equal. On the occurrence of a ground fault on one of the generator windings, however, the ground fault current does not flow through both of the secondaries 28, 29, but only through the secondary 29 in the circuit of the grounded winding. This effects a corresponding electromagnetic reaction on the associated primary 27 whereby the current in the primary is increased and consequently the relay 17' is operated.

This arrangement shown in Fig. 5 also possesses a further advantage in that the relays 17' operate not only in response to ground faults on the windings 7, 8, 9, but also in response to short circuits between the windings. Thus considering a short circuit between two generator windings such as 8 and 9, the balance between the electromotive forces in the secondaries 28, 29 associated with these windings will be upset and therefore the current in the corresponding primaries 27 will increase and thus effect operation of the relays 17'.

In place of the simple current relays 17, 17' illustrated, direction relays may be employed wherever directional action is desired. In such cases one winding of the directional relay may be connected as are the relays 17, 17' while the other winding may be connected to any suitable source such as the bus 13 in a manner well known.

It is to be noted that the transformer secondaries connected on both sides of the machine windings for furnishing the impressed voltages serve as points of reflection for transients and thereby furnish for the generator a certain measure of protection against over-voltage.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is,—

1. In combination with electric apparatus having windings connected to ground, a device connected and arranged to be energized on the occurrence of a ground fault on said windings, and means for insuring the operation of the device when a ground fault occurs relatively closely to the grounded end of a winding arranged to impress an electromotive force on the ground connection.

2. In combination with a polyphase generator having windings connected to ground, means for controlling the circuit of said windings comprising a relay connected and arranged to be energized on the occurrence of a ground fault on the windings, and means for insuring the operation of the relay when a ground fault occurs relatively closely to the grounded end of a winding arranged to impress an electromotive force on the ground connection.

3. In combination with a generator having a winding connected to ground, a device connected and arranged to be energized on the occurrence of a fault on said winding, and means for impressing an electromotive force on the ground connection arranged substantially to prevent the circulation of any current tending to flow by reason of said electromotive force until a fault occurs on said winding.

4. In combination with electric apparatus having windings connected to ground, a device connected and arranged to be energized on the occurrence of a ground fault on said windings, and transforming means for insuring operation of the device when a ground fault occurs relatively closely to the grounded end of a winding connected and arranged to impress on the ground connection an electromotive force derived from the apparatus.

5. In combination with a three-phase generator having star connected windings connected to ground through a relatively high impedance, means for controlling the circuit of said windings comprising a relay connected and arranged to be energized on the occurrence of a ground fault on the windings, and means for impressing on the ground connection on the occurrence of a ground fault on a winding an electromotive force derived from the generator including a transformer having a primary in circuit with said windings on the load side of the generator and a secondary in circuit with the ground connection.

6. In combination with a polyphase generator having windings connected to ground, a device connected and arranged to be energized on the occurrence of a ground fault on said windings, and means for impressing on the ground connection on the occurrence of a ground fault on a winding an electromotive force derived from the generator comprising a transformer having a primary connected across one phase of the generator on the load side thereof, a secondary connected in series with one of the windings associated with said phase on the load side of the generator and a secondary in series with the ground connection.

7. In combination with a polyphase generator having windings connected to ground, means for controlling the circuit of said windings comprising a relay connected and arranged to be energized on the occurrence of a ground fault on said windings, and means for impressing on the ground connection an electromotive force derived from the generator including a transformer having a primary connected across one phase of the generator and a secondary in series with the ground connection and means for preventing the circulation of any current tending to flow by reason of said electromotive force including another secondary in series with one of the windings associated with said phase on the load side of the generator.

8. In combination with an electric circuit having a ground connection and electric apparatus having windings connected to said circuit, a device connected and arranged to be energized on the occurrence of a ground fault on one of said windings, and means for insuring the operation of the device irrespective of the location of the ground fault on said winding arranged to impress an electromotive force on the ground connection.

9. In combination with an electric circuit having a ground connection and electric apparatus having windings connected in star to said circuit, a device connected and arranged to be energized on the occurrence of a ground fault on one of said windings and means for insuring the operation of the device when the ground fault occurs relatively closely to the star point of the windings arranged to impress an electromotive force on the ground connection.

In witness whereof, I have hereunto set my hand this 12th day of August, 1927.

ROBERT POHL.